(12) United States Patent
Riddel et al.

(10) Patent No.: US 7,848,258 B2
(45) Date of Patent: Dec. 7, 2010

(54) DYNAMICALLY TRANSITIONING STATIC NETWORK ADDRESSES

(75) Inventors: Jeffrey Riddel, Cary, NC (US); Michael Reekie, Burlington, MA (US); Lon-Leighton Barrett, Worcester, MA (US); Kenneth Kinnear, Jr., Boxborough, MA (US); Bernard Volz, Center Harbor, NH (US)

(73) Assignee: Cisco Technology, Inc., San Jose, CA (US)

( * ) Notice: Subject to any disclaimer, the term of this patent is extended or adjusted under 35 U.S.C. 154(b) by 121 days.

(21) Appl. No.: 12/366,849

(22) Filed: Feb. 6, 2009

(65) Prior Publication Data

US 2010/0202462 A1    Aug. 12, 2010

(51) Int. Cl.
   *H04L 12/56* (2006.01)

(52) U.S. Cl. .................. 370/254; 370/389; 370/401; 709/220

(58) Field of Classification Search ............. None
See application file for complete search history.

(56) References Cited

U.S. PATENT DOCUMENTS 6,857,009 B1 * 2/2005 Ferreria et al. ............. 709/219
2004/0261116 A1 * 12/2004 Mckeown et al. .......... 725/109
2008/0025327 A1 * 1/2008 Kumar ..................... 370/401
2008/0313729 A1 * 12/2008 Foschiano et al. .......... 726/12
2010/0054316 A1 * 3/2010 Mishra et al. .............. 375/224

* cited by examiner

*Primary Examiner*—Hong Cho
*Assistant Examiner*—Robert C Scheibel
(74) *Attorney, Agent, or Firm*—Hickman Palermo Truong & Becker LLP

(57) ABSTRACT

In an embodiment, an apparatus comprises one or more processors; logic coupled to the one or more processors for execution and configured to perform receiving, from a second computer, a request for information about a first address of a customer premises equipment (CPE) device and including a second address of the second computer; determining that an address record of the first address identifies a third address, which is different from the second address, for a termination unit associated with the CPE device; in response to the determining: causing the generating and sending of one or more updates of inter-domain routing protocol information for the CPE device; updating the address record by storing the second address in a location that identifies the termination unit that is associated with the CPE device.

32 Claims, 7 Drawing Sheets

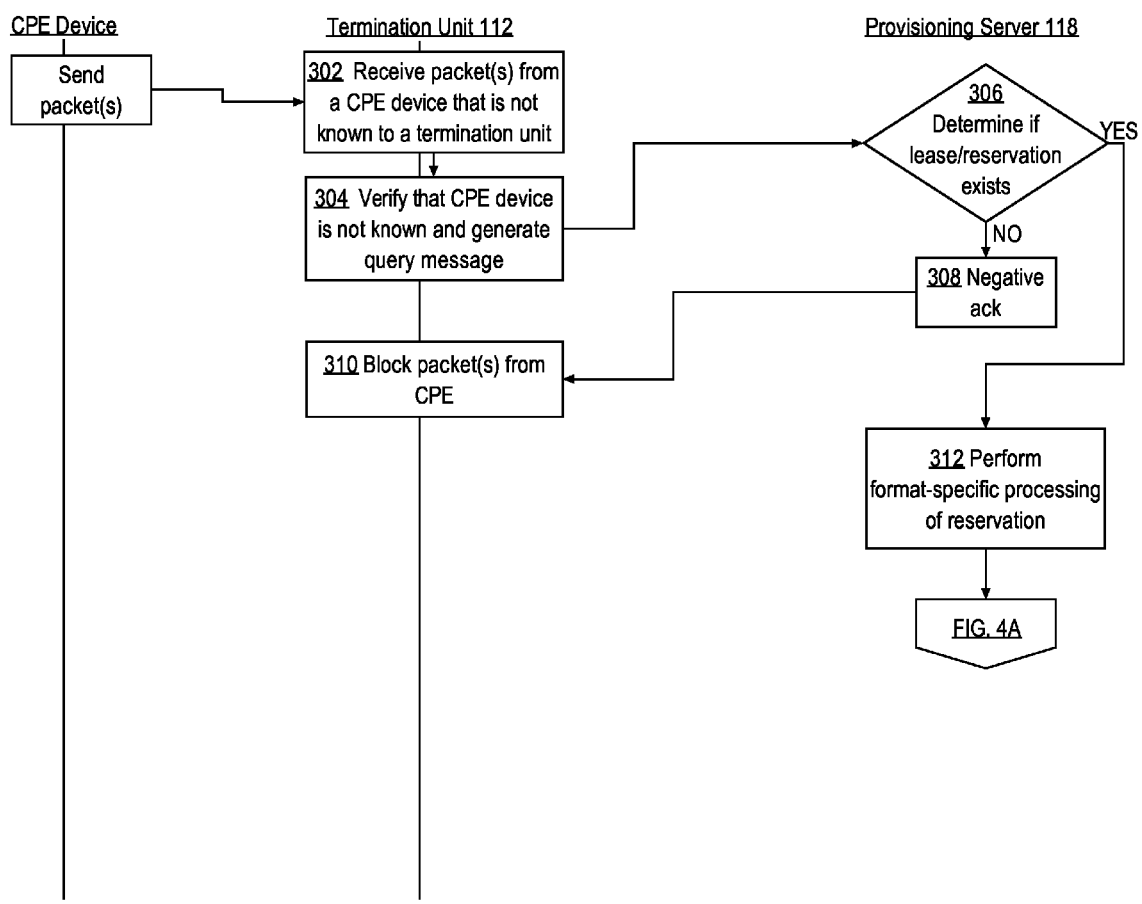

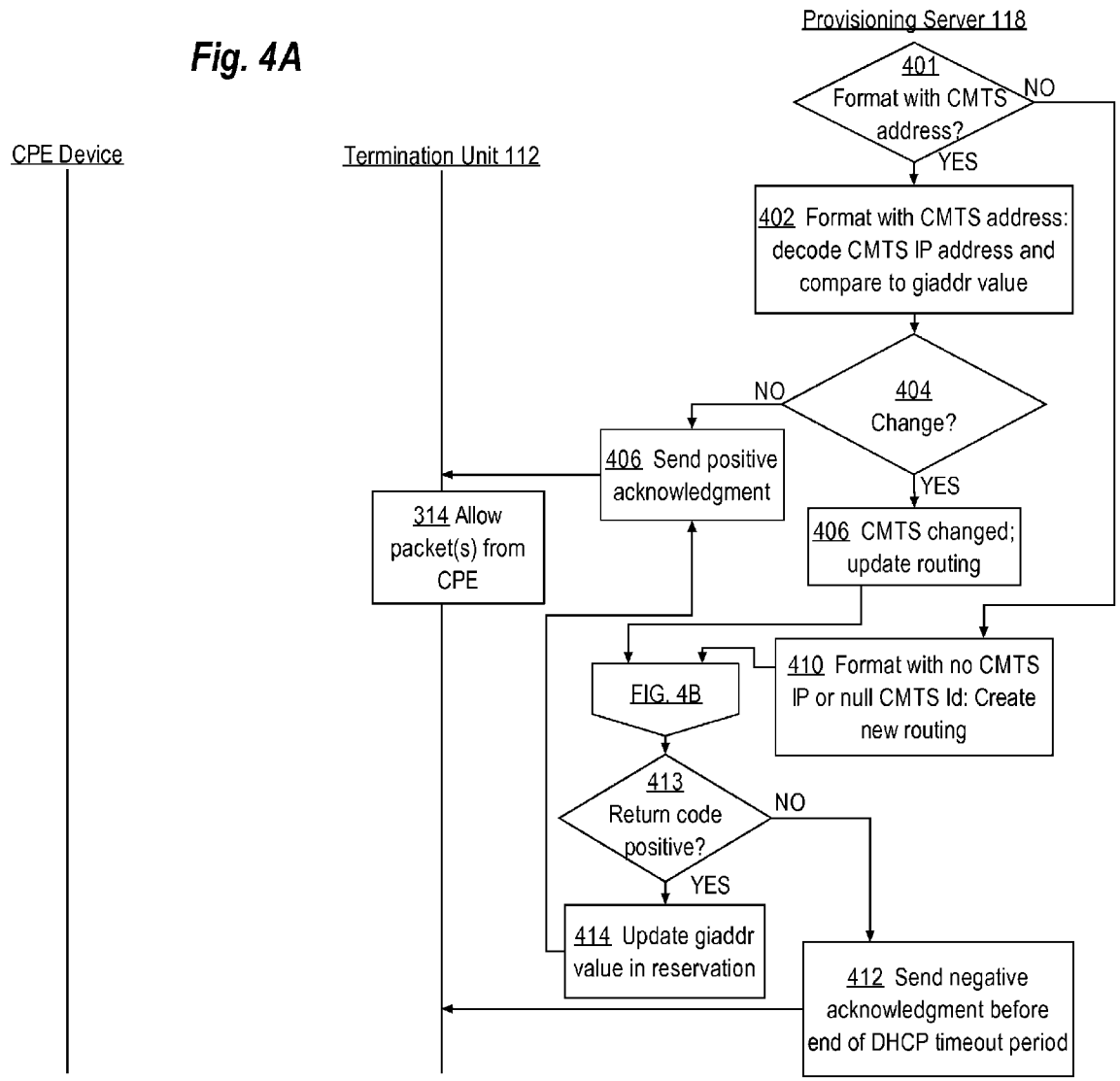

DYNAMICALLY TRANSITIONING STATIC NETWORK ADDRESSES

TECHNICAL FIELD

The present disclosure generally relates to computer network management and relates more specifically to address management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Most end users or institutional customers of cable high speed Internet (HSI) services use dynamically allocated Internet Protocol (IP) addresses for their customer premises equipment (CPE) devices, such as computers, gateway routers, etc. However, some cable HSI customers require static IP addressing. For example, if a customer is hosting a web server then the customer may prefer to have a static IP address assignment, or the customer may require a static IP in order to configure a secure VPN tunnel to remote locations.

The IP address ranges available for cable customers depend upon the IP subnets configured on the Cable Modem Termination System (CMTS) that services the CPE devices. IP subnets are assigned to logical interfaces, which are then referenced by the physical interfaces to which the cable modems are connected. Each CMTS is configured with its own set of IP subnets; consequently, if a cable modem is moved from one location to another that is serviced by a different CMTS than the first location, the cable modem's IP address must change. Moving a group of cable modems from one CMTS to another CMTS happens regularly due to increases in bandwidth requirements where additional CMTS devices are introduced in order to offload traffic.

The impact of such a move between CMTS devices is transparent to customers with dynamically allocated IP address assignments. In particular, when the CPE interface resets, the CPE will re-perform a Dynamic Host Configuration Protocol (DHCP) address leasing process and obtain a new IP address from the available subnets on the new CMTS. However, no such address assignment process is performed for devices with static IP assignments. The cable service provider must change the IP addresses of these devices, and then contact each of these customers with the changes. Further, customers may have to change configuration data on their equipment and/or notify certain entities of the change in addresses. This process is time-consuming, error-prone, and often requires manually-initiated communication steps, making it undesirable.

Request for Comments (RFC) 3344 of The Internet Society and developed by the Internet Engineering Task Force (IETF) defines IP mobility functionality, but implementation requires modification of both the CMTS as well as cable modems.

BRIEF DESCRIPTION OF THE DRAWINGS

In the drawings:

FIG. 3 illustrates another embodiment of a process of dynamic transitioning for static network addresses.

FIG. 4A illustrates determining and responding to changes in termination unit addresses.

DETAILED DESCRIPTION

Figure 1A:
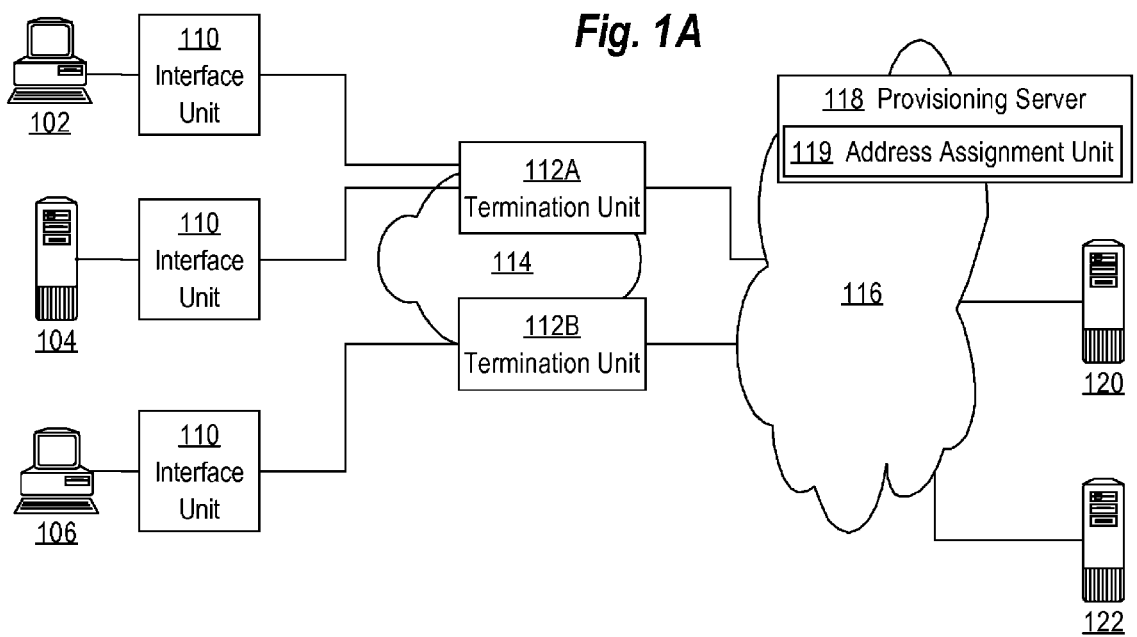
FIG. 1A illustrates an example network in which an embodiment may be used.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Network Context
   2.2 Cable Source Verify (CSV) and DHCP in Termination Units
   2.3 Provisioning Computer and Extension
3.0 Process Examples
   3.1 High-Level Example
   3.2 Cable Modem Example
4.0 Implementation Mechanisms—Hardware Overview
5.0 Extensions and Alternatives 1.0 General Overview In an embodiment, a data processing apparatus comprises one or more processors; logic coupled to the one or more processors for execution and configured to perform: receiving, from a second computer, a request for information about a first address of a customer premises equipment (CPE) device and including an identifier of the second computer; determining that an address record of the first address identifies another identifier, which is different from the identifier of the second computer, for a termination unit associated with the CPE device; in response to the determining: causing the generating and sending of one or more updates of inter-domain routing protocol information for the CPE device; updating the address record by storing the identifier in a location that identifies the termination unit that is associated with the CPE device.

In an embodiment, the second computer is a cable modem termination system (CMTS) and the identifier is a gateway address (giaddr) of the CMTS. The remainder of this document uses the giaddr as the termination unit identifier—however it should be understood that other identifiers of a termination unit could be used as well.

In an embodiment, the logic configured to perform receiving comprises logic configured to perform receiving, from a CMTS, a Dynamic Host Configuration Protocol (DHCP) DHCPLEASEQUERY message specifying a first Internet Protocol (IP) address of a customer premises equipment (CPE) device and including a second IP address of the CMTS in a gateway address (giaddr) field of the message.

In an embodiment, the logic configured to perform receiving comprises logic configured to perform receiving, from cable source verify (CSV) logic of a CMTS, a Dynamic Host Configuration Protocol (DHCP) DHCPLEASEQUERY message specifying a first Internet Protocol (IP) address of a customer premises equipment (CPE) device and including a second IP address of the CMTS in a gateway address (giaddr) field of the message.

In an embodiment, the logic is further configured to perform determining that the address record for the first address does not identify the termination unit associated with the CPE device; and in response to the determining: causing the generating and sending of one or more updates of inter-domain routing protocol information for the CPE device; storing, in the address record, the second address in the location that identifies the termination unit that is associated with the CPE device.

In an embodiment, the logic is further configured to perform, in response to the determining, based on the second address, determining a list of all CPE devices that need routing updates; determining whether network connectivity exists to the CPE devices in the list; causing the generating and sending of the one or more updates of inter-domain routing protocol information only for the CPE devices in the list that do not have network connectivity to the computer.

In an embodiment, the logic is further configured to perform: while performing the determining, causing and updating: sending, to the second computer before the end of a timeout period associated with the request of the second computer, a negative acknowledgment to the request of the second computer.

In an embodiment, the apparatus comprises a provisioning computer having a DHCP server, and wherein the logic configured to perform the determining, causing and updating comprises an extension script.

In an embodiment, the apparatus further comprises logic configured to perform sending, to the second computer and after the updating, a positive acknowledgment to the request of the second computer.

In other embodiments, the invention encompasses a computer-implemented method and a computer-readable medium.

2.0 Structural and Functional Overview 2.1 Network Context

In an embodiment, customer premises equipment (CPE) network devices can maintain a static network address even when a change occurs in the network interface device to which the CPE device is connected. Embodiments may be used with cable modems connected to CMTS units. Other embodiments may be used with DSL modems or other DSL networking devices connected to DSLAM units, aggregation routers, or other termination or aggregation units.

In an embodiment, no program code change is required to the CMTS, to the cable modems, or to the CPE devices to achieve the functions described herein. A back-end provisioning system has sole responsibility to track CPE devices with static network addresses, and network interface devices do not need to be modified or changed.

FIG. 1A illustrates an example network in which an embodiment may be used. The arrangement of FIG. 1A is provided solely to illustrate a clear example, and other embodiments may use more or fewer elements than shown in FIG. 1A. In an embodiment, each of a plurality of end user computers 102, 104, 106, which comprise customer premises equipment (CPE) is coupled to a network interface unit 110. In other embodiments, other kinds of CPE units may be used such as a home network gateway or router. The interface units 110 are typically also located at customer premises, such as a place of business or home, and may be coupled to a personal computer, workstation, server, router, hub, or other computing unit. Examples of interface units 110 include cable modems and DSL modems.

Each interface unit 110 is coupled to one of a plurality of termination units 112A, 112B. Each termination unit 112A, 112B may terminate connections from a plurality of interface units 110. For example, termination unit 112A may be coupled to multiple interface units 110. Each termination unit 112A, 112B is located within a distribution network 114, which represents cables or wireless links between the interface units 110 and a service provider, and each termination unit 112A, 112B may comprise a router, relay, or other device that provides connectivity to a network. For example, in one embodiment using cable modems, distribution network 114 comprises network cables and the termination units 112A, 112B may be coupled to the cables in field locations such as vaults, closets, or company offices, and the termination units comprise Cable Modem Termination Systems (CMTS).

Distribution network 114 interfaces to a service provider network 116, which may comprise one or more internetworks. A provisioning server 118 may be coupled to the service provider network 116 at a management points associated with a service provider that provides network service to the interface units 110. The provisioning server 118 may include an address assignment unit 119 that is configured to dynamically assign network addresses to interface units 110 and/or computers 102, 104, 106, and to store records of statically assigned addresses. The address assignment unit 119 may include or may be coupled to a data storage repository that stores tables mapping the network addresses of interface units 110 to addresses of computers 102, 104, 106 and to addresses of termination units 112A, 112B, depending on which termination unit is servicing which CPE and interface unit. The address assignment unit 119 also may comprise address transition logic configured to perform steps of FIG. 1B as further described herein so that interface units 110 having static network addresses can transition to or be moved from one termination unit 112A to another termination unit 112B.

The service provider network 116 may include any number of network resources, represented by servers 120, 122, which may provide network applications, storage, or other computing facilities for use by end users of interface units 110.

Figure 2:
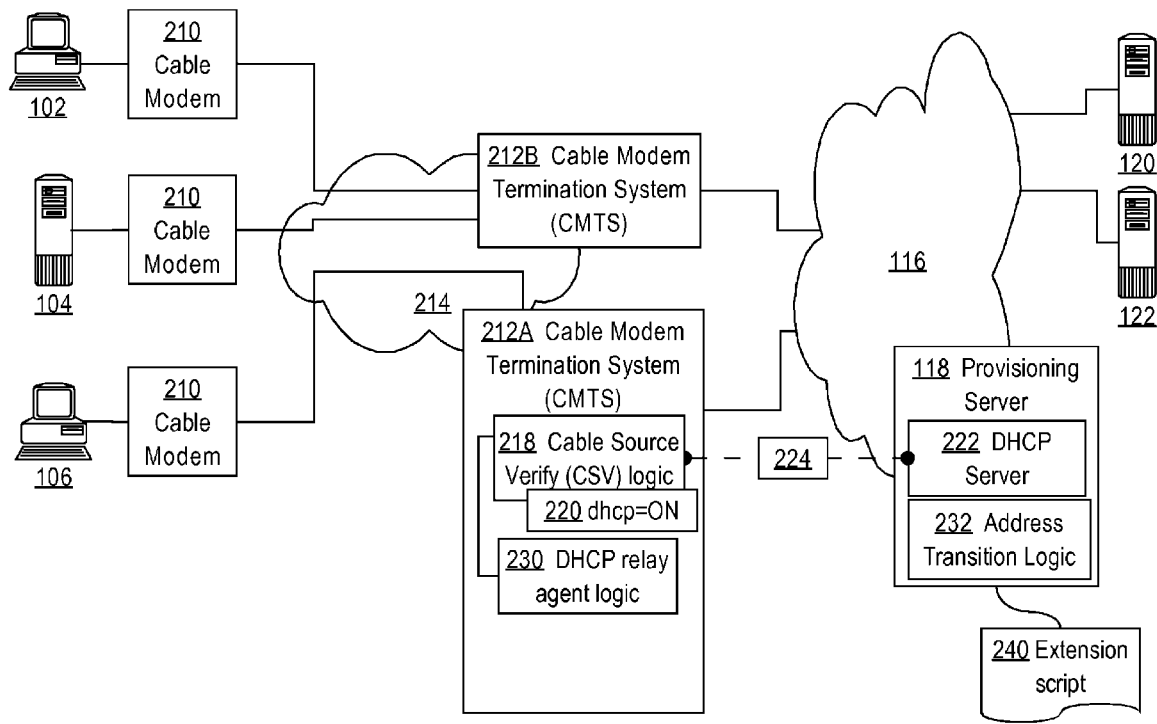
FIG. 2 illustrates a cable network in which an embodiment may be used.

FIG. 2 illustrates a cable network in which an embodiment may be used. The arrangement of FIG. 2 is provided solely to illustrate a clear example, and other embodiments may use more or fewer elements than shown in FIG. 2. In an embodiment, each of a plurality of end user computers 102, 104, 106 is coupled to a cable modem 210. The cable modems 210 are typically located at customer premises, such as a place of business or home, and may be coupled to a personal computer, workstation, server, router, hub, or other computing unit.

Each cable modem 210 is coupled to one of a plurality of cable modem termination systems (CMTS) 212A, 212B. Each CMTS 212A, 212B may terminate connections from a plurality of cable modems 210. For example, CMTS 212A may be coupled to multiple cable modems 210. Each CMTS 212A, 212B is located within a distribution network 214, which represents cables between the cable modems 210 and a service provider.

Distribution network 214 interfaces to a service provider network 116, which may comprise one or more internetworks. A provisioning server 118 may be coupled to the service provider network 116 at a management points associated with a service provider that provides network service to the cable modems 210. The service provider network 116 may include any number of network resources, represented by servers 120, 122, which may provide network applications, storage, or other computing facilities for use by end users of cable modems 210.

2.2 Cable Source Verify (CSV) and DHCP in Termination Units

In an embodiment, each CMTS 212A, 212B of FIG. 2 implements Cable Source Verify (CSV) logic 218. In FIG. 2, internal elements of CMTS 212A are shown to illustrate a clear example and CMTS 212B and every other CMTS in the embodiment may be similarly configured. CSV is commercially available in CMTS units available from Cisco Systems, Inc., San Jose, Calif. In operation, the CSV logic ensures the legitimacy of source IP addresses in packets received at the CMTS from CPE devices and cable modems. Further, CSV enables a CMTS to track associations between CPE IP addresses, CPE MAC addresses, and the cable modem or other interface unit to which they are connected.

In an embodiment, each CMTS of FIG. 2 implements CSV logic 218 with a "dhcp" option enabled as represented by box 220. When the "dhcp" option of CSV logic 218 is enabled, any time an unknown source IP address is detected by the CSV logic in a CMTS 212A, the CMTS generates and sends a DHCPLEASEQUERY message 224 to a DHCP server 222 for verification. The DHCPLEASEQUERY message 224 contains the unknown IP address. The responding DHCP server 222 looks up the IP address and returns the MAC address to which the IP address has been assigned, as well as the MAC address of the cable modem to which the source device is authorized to be connected. The CMTS 212A compares the returned CPE MAC addresses to the CPE source MAC addresses that the CMTS received in the unknown traffic. If the MAC addresses match, then the CMTS 212A allows the traffic to pass; if the MAC addresses are different, the CMTS drops the traffic.

The form and conventional use of a DHCPLEASEQUERY message is described in Request for Comments (RFC) 4388 of the Internet Engineering Task Force. RFC 4388 further describes the lease query protocol.

Each CMTS further comprises DHCP relay agent logic 230 and functions as a DHCP relay agent. Thus, DHCP relay agent logic 230 is configured to cause the CMTS 212A to intercept DHCP packets from cable modems 210 and CPE devices 102, 104, and 106 and forward the packets to DHCP server 222. Further, DHCP relay agent logic 230 is configured to receive packets from DHCP server 222 or other DHCP servers and forward the packets to destination cable modems 210 and CPE devices 102, 104, and 106. In each packet that is forwarded to a DHCP server 222, the CMTS 212A identifies itself by inserting its IP address in the gateway IP address (or giaddr) field of the packet.

DHCP relay agent logic 230 also can insert DHCP option 82 (relay agent information) into requests received from cable modems 210 and CPE devices 102, 104, and 106 before the relay agent logic forwards the requests to DHCP server 222. The content of DHCP option 82 includes the corresponding cable modem MAC address when packets are sent from CPE devices. Option 82 is also used by the provisioning server 118 to provide the CMTS 212A with the MAC address of a cable modem 210 in response to a DHCPLEASEQUERY.

However, if a CPE device such as computer 102 has a static IP address and the CMTS 212B to which the CPE device is connected does have CSV, the device will be unable to send and receive traffic, because the DHCP server 222 will have no record of the CPE device or its address assignment, and will send a negative acknowledgement resulting in the CMTS denying IP access. The techniques herein circumvent this problem and permit CPE devices to be reassigned or moved to different termination units at any time.

2.3 Provisioning Computer with Fixed IP for CSV Using an Extension

The provisioning server 118 in the network arrangement of FIG. 2 also may be configured to receive user input specifying configuration data for the CMTS 212A, 212B and to communicate the configuration data to the CMTS units. In an embodiment, the provisioning server 118 comprises Cisco Network Registrar (CNR), commercially available from Cisco Systems, Inc., San Jose, Calif. In this embodiment the network provisioning server 118 can function as a DHCP server.

When CNR is used, the network provisioning server 118 also can influence the DHCP process using one or more custom extension scripts. An extension script 240 may be used to address the problem of operating a CPE device having a static IP using a CMTS 212B that does have CSV with the "dhcp" option enabled. In an embodiment, the association of a CPE MAC address to a cable modem MAC address is pre-defined in CNR using a custom reservation. An example of the format of command-line interface (CLI) syntax to create a reservation is:

nrcmd>reservation 24.33.10.10 create 1,12,aa:aa:aa:aa:aa:aa:bb:bb:bb:bb:bb:bb 100 Ok The address value in a traditional reservation is the six-byte MAC address associated with the IP address. However, in this example the reservation is set to a value of twelve bytes comprising the CPE device MAC address (in this example, "aa:aa:aa:aa:aa:aa") followed by the associated cable modem MAC address (in this example, "bb:bb:bb:bb:bb:bb"). This type of reservation in an extension script 240 will configure the provisioning server 118 to create appropriate responses to DHCPLEASEQUERY messages that are generated by the CMTS for CPE devices with static IP addresses. As a result, traffic from a CPE device with a static IP address will be allowed to pass.

In an embodiment using CNR, extension script 240 may accomplish the functions described above. In other embodiments, provisioning server 118 may comprise logic that integrates or incorporates the same functions and thus the use of an extension or script is not required.

In an embodiment, provisioning server 118 further comprises address transition logic 232, which implements the functions of the provisioning server and address assignment unit that are described herein with reference to FIG. 1B, FIG. 3, FIG. 4A, and FIG. 4B. Thus, in one embodiment, an implementation of the techniques herein does not require any modification of each CMTS 212A, 212B or termination unit 112. Instead, the provisioning server 118 is solely responsible and configured to provide the special-purpose functions described herein for address transitioning. As a result, deployment of the techniques herein is greatly simplified because the CMTS units in the field do not need modification and the principal logic is centralized at the provisioning server.

3.0 Process Examples

3.1 High-Level Example

Figure 1B:
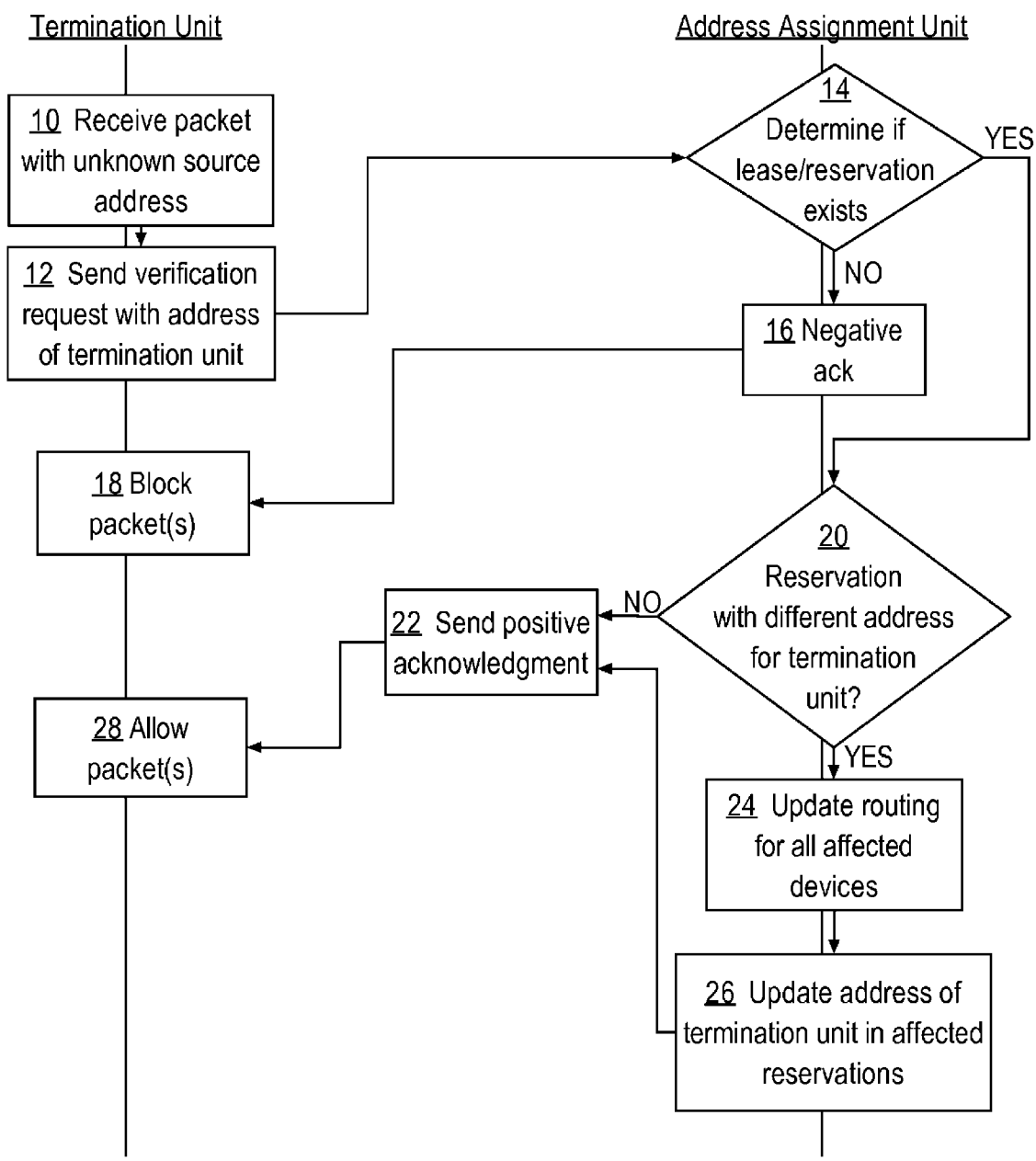
FIG. 1B illustrates an embodiment of a process of dynamic transitioning for static network addresses.

FIG. 1B illustrates an embodiment of a process of dynamic transitioning for static network addresses. Steps in FIG. 1B are performed by a termination unit and an address assignment unit. Examples of the termination unit include a CMTS or a DSLAM. Examples of the address assignment unit include a DHCP server or provisioning server. In some embodiments, all steps of FIG. 1B may be performed by the same unit.

In step 10, the termination unit receives a packet carrying an unknown source IP address. Typically the received packet is from a CPE device for which the termination unit was changed, so that the current termination unit is receiving packets from the device for the first time. In step 12, the termination unit sends to the address assignment unit a verification request, and includes the address of the termination unit in the request.

At step 14, the address assignment unit determines if it currently is storing a lease, reservation, or other record identifying the source address of the CPE device. If not, then in step 16 a negative acknowledgment is sent and at step 18 the termination unit blocks packets from the CPE device. Steps 16 and 18 are typically invoked when an unauthorized CPE device is attempting to send packets into the network using the termination unit, and may represent a security risk.

If a lease, reservation or other record exists, and the reservation is in a format that includes an address of a termination unit, then in step 20 the address assignment unit tests whether the lease, reservation or other record indicates an address of a termination unit that is different than the address of the requesting termination unit. The test of step 20 is negative when the termination unit has not been changed and positive when the termination unit has been changed. If no change has occurred, then in step 22 the address assignment unit sends a positive acknowledgment to signal the termination unit that allowing packets from the CPE device is acceptable. In step 28, in response, the termination unit allows packets from the new CPE device to flow into the network.

If the test of step 20 is positive, then in step 24 the address assignment unit causes an update in routing information to occur for all affected CPE devices. In an embodiment, "affected CPE devices" includes the CPE device that sent the packet received at step 10 and any other CPE devices for which updating is pending. For example, step 24 may be implemented as an independent process that loops continuously waiting for notification from other steps of FIG. 1B about devices that need updating, or may use an input queue that is filled by other steps of the process. As part of step 24, for example, the address assignment unit attempts to contact the current CPE device; if the device cannot be contacted, then routing information for it is updated in step 24. If the device can be contacted, an error condition exists and responsive steps are described in further sections below.

At step 26, after completing routing updates at step 24, the address assignment unit updates the address of the termination unit in the leases, reservations or other records associated with the affected devices.

As a result, CPE devices holding static network addresses can be moved to different termination units, and the termination units can verify the move and perform responsive changes.

3.2 Cable Modem Example

FIG. 3 illustrates another embodiment of a process of dynamic transitioning for static network addresses. The example embodiment of FIG. 3 assumes that a CMTS has CSV logic with the DHCP feature enabled, and the provisioning server 118 has an extension of the type described above.

In step 302, one or more packets are received from a CPE device that is not known to a termination unit. The IP address is unknown, for example, when a new CPE device is introduced to the network or an existing CPE device has been reassigned to a different CMTS than the CPE device used in the past. In step 304, the CPE device is verified as unknown, and a query message is generated. For example, if the packets are received at a CMTS having Cable Source Verify logic with DHCP configured, then the CMTS identifies the source IP address in the packet as unknown and generates a DHCPLEASEQUERY message to a DHCP server. The DHCP message is directed to any one DHCP server among a plurality of DHCP servers that has been configured on the CMTS as servicing requests for the CMTS.

In step 306, the provisioning server determines if the source IP address of the CPE device is known. In one embodiment, a DHCP server or CNR logic determines from a stored table or database whether a lease or reservation exists for the CPE IP address.

If a reservation is found and has a null value for the "giaddr," then either of two approaches may be used. In one approach, the lack of an existing giaddr in th reservation is interpreted as receiving a new static network address, so that new routing data needs to be created, and processing continues at step 410 of FIG. 4A as described below. In another approach, a negative acknowledgement is sent to the CMTS at step 308. In response to receiving a negative acknowledgment, at step 310, the termination unit does not permit the CPE device to send traffic into the network. For example, at step 310 the termination unit drops the packets it received, and/or configures itself not to permit forwarding packets. If no lease or reservation is found, then a negative acknowledgment is returned.

Figure 4B:
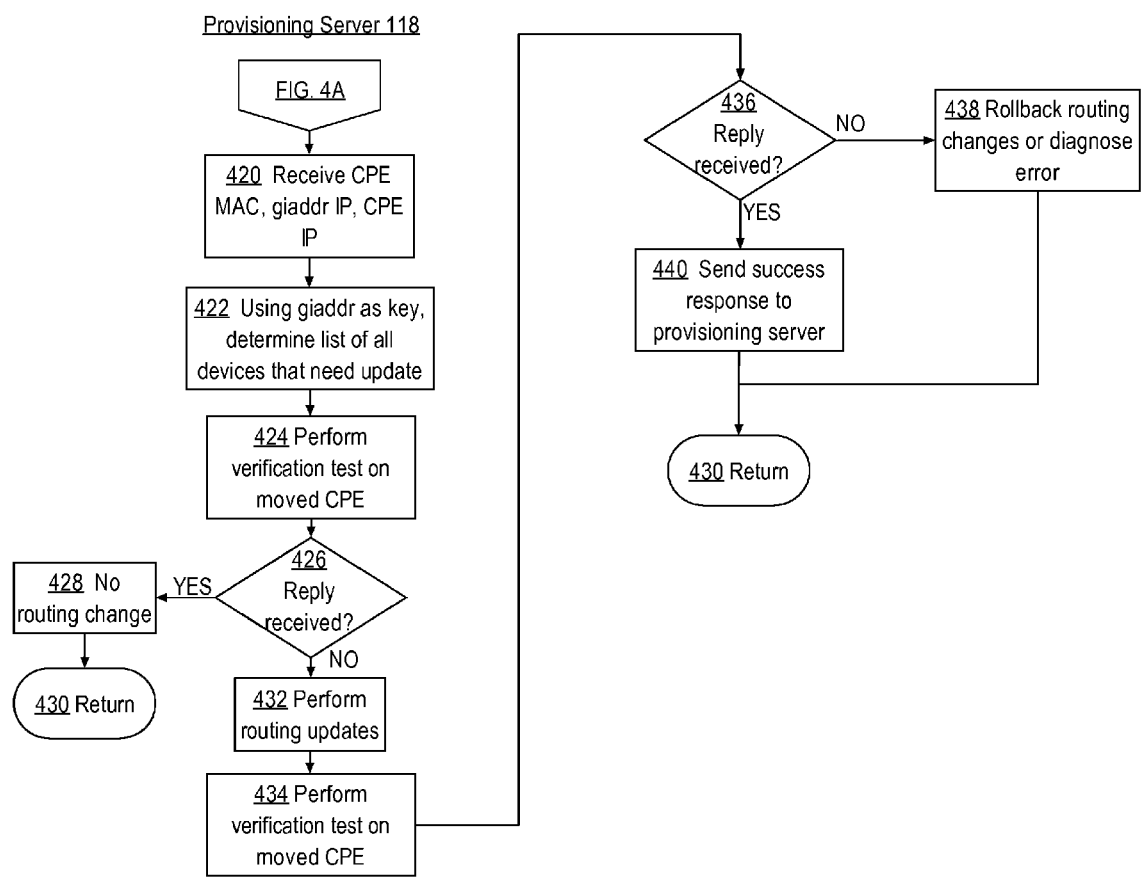
FIG. 4B illustrates performing device routing updates in response to changes in termination unit addresses.

If a lease or reservation exists at step 306, then at step 312 the process performs processing of the lease or reservation according to any of several techniques depending on a format of the lease or reservation data. Example techniques are described with reference to FIG. 4A and FIG. 4B. FIG. 4A illustrates determining and responding to changes in termination unit addresses. FIG. 4B illustrates performing device routing updates in response to changes in termination unit addresses.

Step 312 may also encompass a test to determine whether the reservation has a format requiring special processing. For example it may be tested whether the reservation is in a triplet format (consisting of CPE MAC address, CM MAC address, CMTS identifier) or a duplet format (consisting of CPE MAC address and CMTS identifier) and if not, then no special processing as described in this document is performed and the process replies with either a positive or negative acknowledgment depending on whether a reservation or lease exists.

Referring first to FIG. 4A, in general, if a reservation has been found at step 306 of FIG. 3 then a check is done at step 401 to see if the format of the reservation warrants execution of special processing, for example, using extension script 240 of FIG. 2. The format of the reservation may be a duplet format discussed previously and consisting of CPE device and corresponding cable modem MAC addresses. Alternatively, the reservation may use a triplet format comprising a 6-byte CPE device MAC address, 6-byte cable modem MAC address, and 4-byte IP address representing the CMTS to which the devices are connected. An example 16-bye reservation has the format "aa:aa:aa:aa:aa:aa:bb:bb:bb:bb:bb:bb:cc:cc:cc:cc", in which "cc:cc:cc:cc" is the hexadecimal representation of the CMTS "giaddr" value. The reservation could also be a duplet format consisting of CPE device MAC address and CMTS identifier. If the reservation is neither the duplet format nor triplet format then no special processing is performed and the CPE device will be unable to transition.

As shown in step 402 of FIG. 4A, if the reservation is in either the duplet or triplet format, then the process decodes the CMTS IP address from the reservation and compares the decoded address value to the "giaddr" value that was received in the DHCPLEASEQUERY. Step 404 tests whether an address change is indicated. An address change is detected when the CMTS IP address retrieved from an existing reservation does not match the "giaddr" value that was received in the DHCPLEASEQUERY; in this situation, the address of record for the DHCP lease identifies a termination unit different than the one that is identified in the request received from the termination unit and therefore the termination unit must have been changed.

If no change in the address is indicated, then no routing needs to be updated; in response, a positive acknowledgement to the DHCPLEASEQUERY is sent at step 406. Upon receiving the positive acknowledgment, the termination unit will allow packets from the CPE device to be forwarded into the network, at step 314 of FIG. 4A.

At step 406, if the "giaddr" has changed, then the CPE device has moved to a different CMTS, and routing needs to be updated. In an embodiment, a separate router update process is used, as described below with reference to FIG. 4B. In an embodiment, the router update process is hosted in the provisioning server 118, but the router update process also may be hosted on a different computer.

At step 410, if a new static address has been received then new routing data needs to be created. In particular, a reservation with an all zero value for the "giaddr" indicates that this is the first time that the CPE device has come online since it was provisioned and so a new static route needs to be created for it.

If the reservation is not in the triplet format processed at step 402 or in the duplet format processed at step 410, then no special processing is performed in FIG. 4A and the process replies with either a positive or negative acknowledgment depending on whether a reservation or lease exists. However in the case of a Cisco CMTS with the CSV feature enabled; the termination unit 112 receiving the acknowledgment will lack a MAC address of the interface unit 110 and therefore the termination unit will be unable to honor the lease.

In an embodiment, a background process or timer tracks the timeout value applicable to the verification request that was sent at step 304 of FIG. 3. If the timeout is about to expire, then in step 412, the process responds to the DHCPLEASEQUERY with a negative acknowledgment. As a result, the original DHCPLEASEQUERY will not time out but will receive a substantive reply. If the processes of FIG. 3, FIG. 4A, and FIG. 4B cannot be completed before a timeout, then the termination unit 112 can issue a retry message; eventually the necessary updates will have been made and future lease queries will result in a positive acknowledgement.

Steps 312 of FIG. 3 and steps 402 to 414 of FIG. 4A may be implemented using the extension script 240, other extension logic for the provisioning server 118, or directly in the provisioning server.

Referring now to FIG. 4B, in a routing update process, in step 420 the following information is received from the extension script or other logic: (a CPE device MAC, a giaddr IP, and a CPE device IP). In some embodiments, optionally a MAC address of the cable modem associated with the CPE device is also received.

In step 422, using the "giaddr" value as a key, the process determines or looks up a list of all device(s) that require a routing update. For each device in the list, steps 424 to 440 are then performed. This arrangement is optional; for example, for performance reasons, FIG. 4B may be implemented as a separate process that operates asynchronously with respect to the process of FIG. 4A, running in a loop or other continuous fashion until information is received about routing changes that need to be implemented. The process could be supported, for example, by a table of routers that require changes to their routing tables as requested by the process of FIG. 4A. Each router could be represented in the table by a "giaddr" value.

In step 424, a test is performed to verify that the CPE device's IP address is not reachable. For example, a "ping" operation may be performed, but in other embodiments other forms of verification testing may be used. Step 426 determines whether a reply was received. If the CPE device address is reachable so that step 426 is positive, then an error has occurred, because the process previously detected a device move and therefore the current routing should be incorrect. This could indicate a processing error or a security breach; in either case, at step 428 no routing changes should be made and the process returns or otherwise ends at step 430. An error or exception may be thrown, logged, or otherwise identified to the provisioning server, to another process, or to an administrator.

In step 432, if the device was not reachable, then routing updates are performed on the device. Routing updates may comprise, for example, manipulating static routes using a routing software package such as VTY or Zebra, or by sending Border Gateway Protocol (BGP) routing updates directly from the provisioning server or update process to BGP peers.

In step 434, a test is performed to verify that the routing updates were successful. For example, a "ping" test or other form of verification test may be performed. Step 436 tests whether a reply was received. If step 436 is negative, then the CPE device may be down or an error condition may exist. In an embodiment, in step 438 the routing changes are rolled back, or the error is diagnosed. However, since the reachability test of step 424 and step 426 also yielded no response, performing a rollback may not be justified.

In step 440, if step 436 was positive, then a success response is communicated to the provisioning server. Step 440 may be omitted if FIG. 4B is not implemented as an internal process. Instead, control may transfer to step 430 to return without an error condition.

Referring again to FIG. 4A, when the routing update process completes, control passes to step 413 in which a test is performed of a return code received from the routing update process. If the return code is positive or otherwise indicates success, the control moves to step 414 in which the lease or reservation is updated with the new encoded giaddr field. Therefore, future lease queries will succeed. If new routing has been created, then step 414 may include writing a new lease record or reservation record to the data repository of the provisioning server. If the test of step 413 is negative then control passes to step 412 in which a negative acknowledgment is sent.

Using the methods herein, customers can maintain a static IP address for a CPE device even when the CMTS to which the CPE is connected changes. In this method no code change is required to the CMTS or other termination unit, or to the cable modems or other interface units to achieve the desired functionality. Principal logic for tracking statically addressed CPE devices, and performing reassignment of termination unit addresses when the CPE devices move to different termination units, is configured in a centralized provisioning system.

Embodiments may be useful to network or Internet service providers, DHCP server vendors, system integrators and add-on product vendors using extension interfaces for a DHCP server.

To illustrate a clear example, certain embodiments have been described in the context of cable modems and CMTS units. However, other embodiments may be used in the context of Ethernet-based DSL, metro Ethernet, and other transports that assign CPE devices to aggregation routers or other termination units. In such arrangements, a DSLAM, aggregation router or other intermediate unit may be configured with verification logic to trigger a DHCPLEASEQUERY in response to receiving an address of a previously unknown CPE device. Thus, in embodiments that do not use a cable modem interposed between the intermediate unit and a CPE device having a statically assigned address, an alternate mechanism can be used to identify reservations requiring special processing.

4.0 Implementation Mechanisms—Hardware Overview

Figure 5:
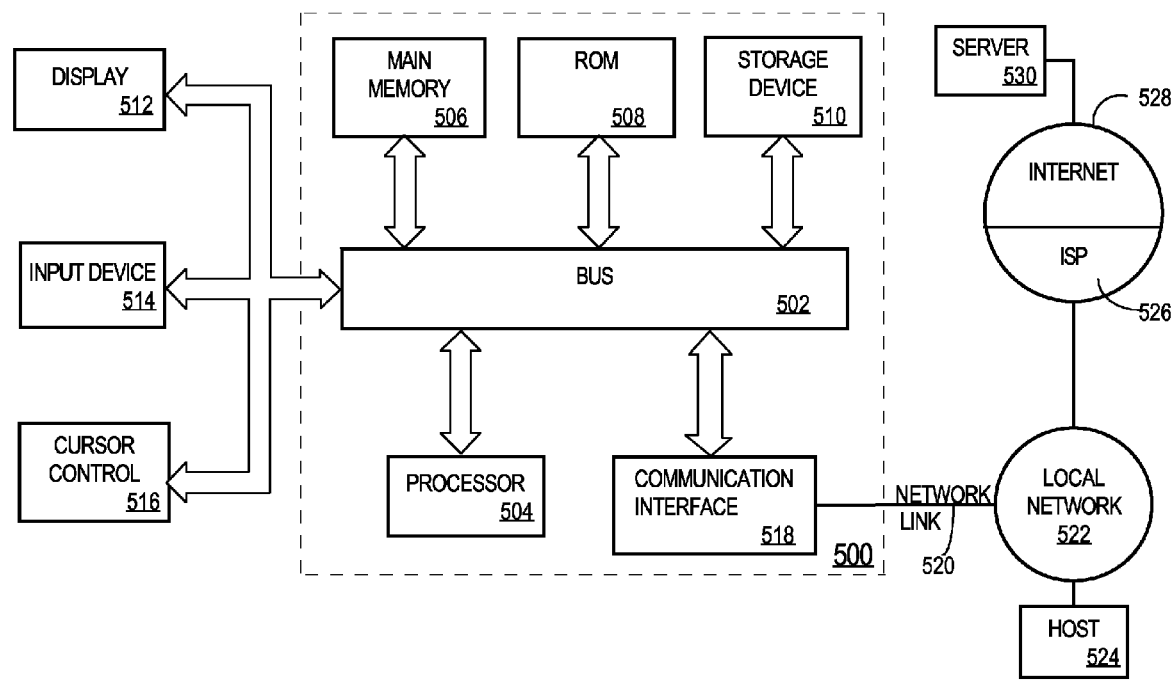
FIG. 5 illustrates a computer system on which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus, comprising:
   one or more processors;
   logic coupled to the one or more processors for execution and configured to perform:
   receiving, from a second computer, a request for information about a first address of a customer premises equipment (CPE) device and including an identifier of the second computer;
   determining that an address record of the first address identifies another identifier, which is different from the identifier of the second computer, for a termination unit associated with the CPE device;
   in response to the determining: causing the generating and sending of one or more updates of inter-domain routing protocol information for the CPE device; updating the address record by storing the identifier in a location that identifies the termination unit that is associated with the CPE device.

2. The apparatus of claim 1, wherein the second computer is a cable modem termination system (CMTS) and the identifier is a gateway address (giaddr) of the CMTS.

3. The apparatus of claim 1, wherein the logic configured to perform receiving comprises logic configured to perform receiving, from a CMTS, a Dynamic Host Configuration Protocol (DHCP) DHCPLEASEQUERY message specifying a first Internet Protocol (IP) address of a customer premises equipment (CPE) device and including a second IP address of the CMTS in a gateway address (giaddr) field of the message.

4. The apparatus of claim 1, wherein the logic configured to perform receiving comprises logic configured to perform receiving, from cable source verify (CSV) logic of a CMTS, a dynamic host control protocol (DHCP) DHCPLEASEQUERY message specifying a first Internet Protocol (IP) address of a customer premises equipment (CPE) device and including a second IP address of the CMTS in a gateway address (giaddr) field of the message.

5. The apparatus of claim 1, wherein the logic is further configured to perform:
   determining that the address record for the first address does not identify the termination unit associated with the CPE device;
   in response to the determining:
   causing the generating and sending of one or more updates of inter-domain routing protocol information for the CPE device;
   storing, in the address record, the second address in the location that identifies the termination unit that is associated with the CPE device.

6. The apparatus of claim 1, wherein the logic is further configured to perform:
   determining that the address record for the first address does not match the termination unit associated with the CPE device;
   in response to the determining:
   causing the generating and sending of one or more updates of inter-domain routing protocol information for the CPE device;
   storing, in the address record, the second address in the location that identifies the termination unit that is associated with the CPE device.

7. The apparatus of claim 1 wherein the logic is further configured to perform:
   in response to the determining:
   based on the second address, determining a list of all CPE devices that need routing updates;
   determining whether network connectivity exists to the CPE devices in the list;
   causing the generating of the one or more updates of inter-domain routing protocol information only for the CPE devices in the list that do not have network connectivity to the computer;
   causing a bulk sending of all the updates.

8. The apparatus of claim 1 wherein the logic is further configured to perform: while performing the determining, causing and updating: sending, to the second computer before the end of a timeout period associated with the request of the second computer, a negative acknowledgment to the request of the second computer.

9. The apparatus of claim 1, wherein the apparatus comprises a provisioning computer having a DHCP server, and wherein the logic configured to perform the determining, causing and updating comprises an extension script.

10. The apparatus of claim 1, further comprising logic configured to perform sending, to the second computer and after the updating, a positive acknowledgment to the request of the second computer.

11. A computer, comprising:
    one or more processors;
    logic coupled to the one or more processors for execution and configured to perform:
    receiving, from a cable modem termination system (CMTS), a dynamic host control protocol (DHCP) DHCPLEASEQUERY message that includes a static first network address of a customer premises equipment (CPE) device and a second network address of the CMTS in a gateway interface address ("giaddr") field of the message;
    determining that an address record of the first address identifies a third address, which is different from the second address, for a different CMTS associated with the CPE device;
    in response to the determining: causing the generating and sending of one or more updates of inter-domain routing protocol information for the CPE device; updating the address record by storing the second address in a location that identifies the CMTS that is associated with the CPE device.

12. The computer of claim 11, wherein the logic that is configured to perform the receiving comprises logic that is configured to perform the receiving from the CMTS coupled to a cable modem that is coupled to the CPE device.

13. The computer of claim 11, wherein the logic is further configured to perform:
   determining that the address record for the first address does not identify the CMTS associated with the CPE device;
   in response to the determining:
   causing the generating and sending of one or more updates of inter-domain routing protocol information for the CPE device;
   storing, in the address record, the second address in the location that identifies the CMTS that is associated with the CPE device.

14. The computer of claim 11 wherein the logic is further configured to perform:
   in response to the determining:
   based on the second address, determining a list of all CPE devices that need routing updates;
   determining whether network connectivity exists to the CPE devices in the list;
   causing the generating and sending of the one or more updates of inter-domain routing protocol information only for the CPE devices in the list that do not have network connectivity to the computer.

15. A computer-implemented method, comprising:
   receiving, from a second computer, a request for information about a first address of a customer premises equipment (CPE) device and including a second address of the second computer;
   determining that an address record of the first address identifies a third address, which is different from the second address, for a termination unit associated with the CPE device;
   in response to the determining: causing the generating and sending of one or more updates of inter-domain routing protocol information for the CPE device; and updating the address record by storing the second address in a location that identifies the termination unit that is associated with the CPE device.

16. The method of claim 15, comprising receiving the request for information from a cable modem termination system (CMTS).

17. The method of claim 15, comprising receiving, from a CMTS, a dynamic host control protocol (DHCP) DHCPLEASEQUERY message specifying a first Internet Protocol (IP) address of a customer premises equipment (CPE) device and including a second IP address of the CMTS in a gateway address (giaddr) field of the message.

18. The method of claim 15, comprising receiving, from cable source verify (CSV) logic of a CMTS, a dynamic host control protocol (DHCP) DHCPLEASEQUERY message specifying a first Internet Protocol (IP) address of a customer premises equipment (CPE) device and including a second IP address of the CMTS in a gateway address (giaddr) field of the message.

19. The method of claim 15, further comprising:
   determining that the address record for the first address does not identify the termination unit associated with the CPE device;
   in response to the determining:
   causing the generating and sending of one or more updates of inter-domain routing protocol information for the CPE device;
   storing, in the address record, the second address in the location that identifies the termination unit that is associated with the CPE device.

20. The method of claim 15 further comprising:
   in response to the determining:
   based on the second address, determining a list of all CPE devices that need routing updates;
   determining whether network connectivity exists to the CPE devices in the list;
   causing the generating and sending of the one or more updates of inter-domain routing protocol information only for the CPE devices in the list that do not have network connectivity to the computer.

21. The method of claim 15 further comprising:
   while performing the determining, causing and updating:
   sending, to the second computer before the end of a timeout period associated with the request of the second computer, a negative acknowledgment to the request of the second computer.

22. The method of claim 15, further comprising sending, to the second computer and after the updating, a positive acknowledgment to the request of the second computer.

23. The method of claim 15, wherein the receiving comprises receiving, from the second computer, a request for information about a static first address of a customer premises equipment (CPE) device and including a second address of the second computer.

24. A non-transitory computer-readable data storage medium storing sequences of instructions which when executed by one or more processors cause the one or more processors to perform:
   receiving, from a second computer, a request for information about a first address of a customer premises equipment (CPE) device and including a second address of the second computer;
   determining that an address record of the first address identifies a third address, which is different from the second address, for a termination unit associated with the CPE device;
   in response to the determining: causing the generating and sending of one or more updates of inter-domain routing protocol information for the CPE device; and updating the address record by storing the second address in a location that identifies the termination unit that is associated with the CPE device.

25. The storage medium of claim 24, further comprising instructions which when executed cause receiving the request for information from a cable modem termination system (CMTS).

26. The storage medium of claim 25, further comprising instructions which when executed cause receiving, from a CMTS, a dynamic host control protocol (DHCP) DHCPLEASEQUERY message specifying a first Internet Protocol (IP) address of a customer premises equipment (CPE) device and including a second IP address of the CMTS in a gateway address (giaddr) field of the message.

27. The storage medium of claim 25, further comprising instructions which when executed cause receiving, from cable source verify (CSV) logic of a CMTS, a dynamic host control protocol (DHCP) DHCPLEASEQUERY message specifying a first Internet Protocol (IP) address of a customer premises equipment (CPE) device and including a second IP address of the CMTS in a gateway address (giaddr) field of the message.

28. The storage medium of claim 25, further comprising instructions which when executed cause:
   determining that the address record for the first address does not identify the termination unit associated with the CPE device;
   in response to the determining:

causing the generating and sending of one or more updates of inter-domain routing protocol information for the CPE device;

storing, in the address record, the second address in the location that identifies the termination unit that is associated with the CPE device.

29. The storage medium of claim 25 further comprising instructions which when executed cause:

in response to the determining:

based on the second address, determining a list of all CPE devices that need routing updates;

determining whether network connectivity exists to the CPE devices in the list;

causing the generating and sending of the one or more updates of inter-domain routing protocol information only for the CPE devices in the list that do not have network connectivity to the computer.

30. The storage medium of claim 25 further comprising instructions which when executed cause:

while performing the determining, causing and updating:

sending, to the second computer before the end of a timeout period associated with the request of the second computer, a negative acknowledgment to the request of the second computer.

31. The storage medium of claim 25, further comprising instructions which when executed cause sending, to the second computer and after the updating, a positive acknowledgment to the request of the second computer.

32. The storage medium of claim 25, wherein the instructions which when executed cause receiving comprise instructions which when executed cause receiving, from the second computer, a request for information about a static first address of a customer premises equipment (CPE) device and including a second address of the second computer.

* * * * *